J. E. WENMAN.
RECEPTACLE LIFTER.
APPLICATION FILED OCT. 6, 1909.
947,049.
Patented Jan. 18, 1910.
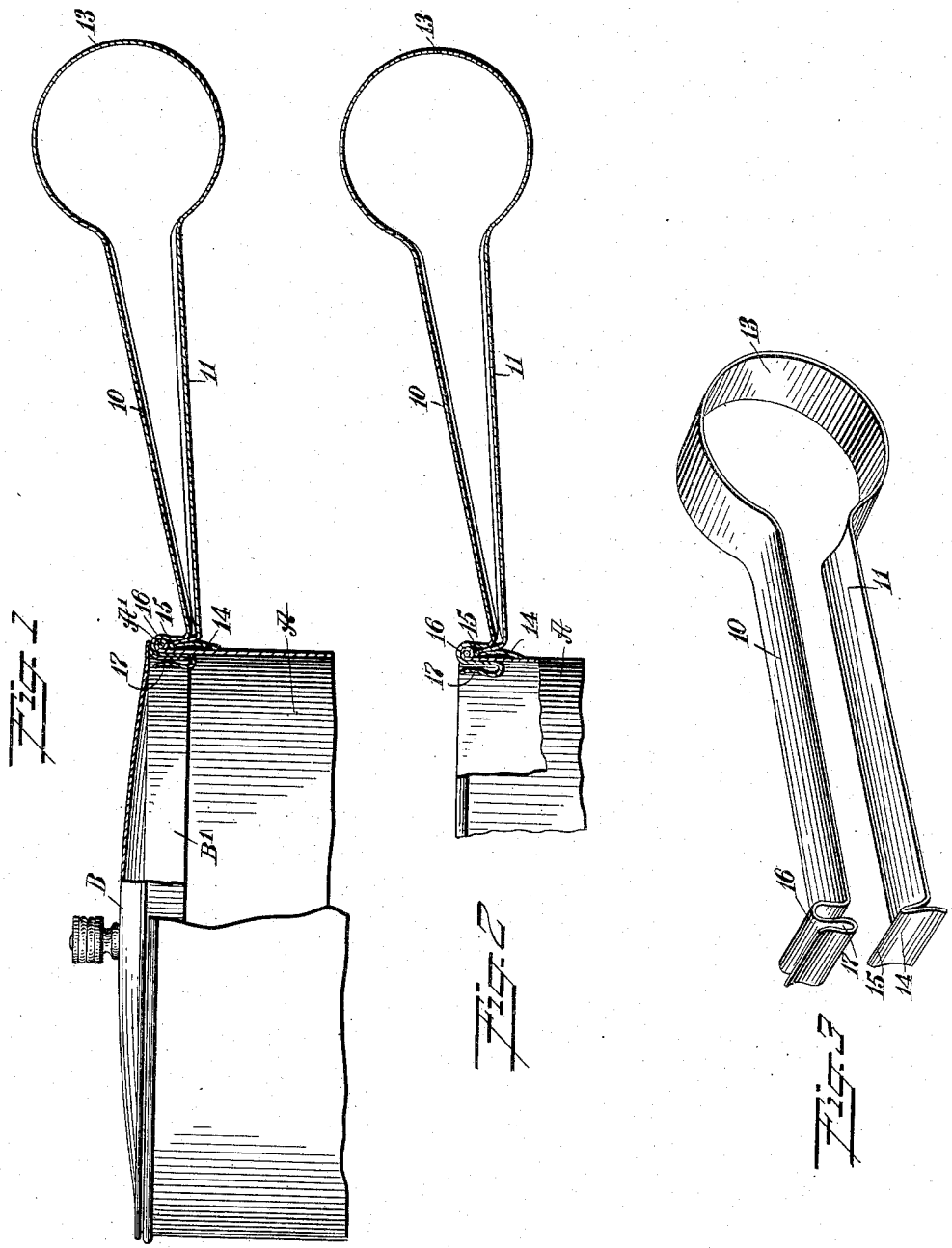
WITNESSES
INVENTOR
Joseph E. Wenman
BY
ATTORNEYS

UNITED STATES PATENT OFFICE.

JOSEPH E. WENMAN, OF NEW PHILADELPHIA, OHIO.

RECEPTACLE-LIFTER.

947,049. Specification of Letters Patent. Patented Jan. 18, 1910.

Application filed October 6, 1909. Serial No. 521,285.

*To all whom it may concern:*

Be it known that I, JOSEPH E. WENMAN, a citizen of the United States, and a resident of New Philadelphia, in the county of Tuscarawas and State of Ohio, have invented a new and Improved Receptacle-Lifter, of which the following is a full, clear, and exact description.

This invention relates to lifters for cooking utensils and other receptacles, and relates more particularly to a device of this class comprising relatively movable handle members, one of said members having a clamp, the other of the members having a part adapted to engage the side of the receptacle, the clamp being so formed that it can bindingly receive part of the receptacle rim, and the above-mentioned part of the other handle member, to lock the device in position with respect to the receptacle.

The object of the invention is to provide a simple, strong and inexpensive receptacle lifter, which can be removably associated with cooking utensils or other receptacles of different kinds and sizes, to permit their manipulation, which can be locked or clamped in position at the rim of a receptacle, by a simple manipulation, which requires the use of but one hand, and which does not interfere with the employment of a lid or cover upon the receptacle, and can, in fact, be used to hold the cover in place.

The invention consists in the construction and combination of parts, to be more fully described hereinafter and particularly set forth in the claims.

Reference is to be had to the accompanying drawings forming a part of this specification, in which similar characters of reference indicate corresponding parts in all the views, and in which—

Figure 1 is a fragmentary cross section of a cooking utensil, showing in longitudinal section an embodiment of my invention applied thereto, the receptacle having a cover mounted thereon; Fig. 2 is a similar view with the cover removed; and Fig. 3 is a perspective view of an embodiment of the lifter.

Before proceeding to a more detailed explanation of my invention, it should be clearly understood that while the device is particularly useful in connection with cooking utensils, it can be advantageously employed with other receptacles which cannot be conveniently grasped and manipulated directly with the hand. I prefer to fashion the lifter from a single piece of spring metal or wire, the normal resiliency of which tends to hold the handle members apart in a predetermined relation. However, if so desired, this feature may be varied, for example, by the interposition of a spring between the handle members, without departing from the underlying spirit of my invention.

Referring more particularly to the drawings, I have shown for example, handle members 10 and 11, fashioned from spring steel or the like. The members at one end are connected by a spring bend 13, which tends to hold them in predetermined relative positions such that they are separated throughout their lengths, as is shown most clearly in Fig. 3.

The member 11 at the end remote from the spring bend, is laterally disposed and folded upon itself to form a preferably slightly curved rest or support 14, adapted to engage at the side of a receptacle A, near the upper rim thereof and under the bead edge A' of the receptacle if the bead is present. The support 14 it will be understood, is laterally disposed with respect to the length of the member 11, and has the upper part constituting a lip 15, which is slightly rounded at the edge.

The member 10, at the end remote from the spring bend, is laterally disposed in three folds or bends, to form, first, a clamp 16 the sides of which are spaced. The remaining bend forms with the clamp itself, a channel 17, for a purpose which will appear hereinafter. The clamp is so formed that it receives, bindingly, part of the rim of the receptacle A, and the upper part or lip 15 of the support, as is shown most clearly in Figs. 1 and 2. The clamp, owing to the normal resiliency of the sides, binds at the edge of the receptacle and with respect to the support, so that the handle members are locked in the relative positions shown in Figs. 1 and 2, and the device is secured with respect to the receptacle and can be employed as a handle in the manipulation of the receptacle.

When a cover B is employed upon the receptacle, having a rim B', the channel 17 serves bindingly to receive the rim, as is shown most clearly in Fig. 1, to hold the cover in place and to assist in locking the lifter with respect to the receptacle.

The members 10 and 11 are preferably curved transversely of their length, to increase their rigidity.

Having thus described my invention, I claim as new, and desire to secure by Letters Patent:

1. A device of the class described, comprising relatively movable, and resiliently connected handle members, one of said members having a recessed clamp, the other of said members having a laterally disposed support adapted to engage the side of the receptacle, said clamp having the sides resiliently spaced, and being formed to receive bindingly the receptacle rim and said support, to lock the device in position with respect to the receptacle.

2. A device of the class described, comprising relatively movable handle members, one of said members having a clamp, the other of said members having a support adapted to engage the side of a receptacle, said clamp being formed bindingly to receive part of the receptacle rim and part of said support, to lock the device in position with respect to the receptacle, one of said members having a channel formed to receive and hold part of a cover for the receptacle.

3. A device of the class described, comprising relatively movable, and resiliently connected handle members, one of said handle members having a laterally disposed support adapted to engage at the outside of a receptacle and having a lip, the other of said members having a laterally disposed and folded part provided with spaced sides and constituting a clamp adapted to receive between the sides thereof and bind thereon, the receptacle rim and said lip of said support, whereby said handle members can be locked in position relative to one another, said clamp having one of the sides extended and folded upon itself to form a channel to receive and hold a cover for the receptacle.

4. A device of the class described, comprising handle members formed from a single, elongated strip of resilient material bent upon itself, whereby said handle members are connected by a spring bend, one of said handle members having a support adapted to engage a receptacle, the other of said members having a recessed clamp adapted to receive therein said support and the receptacle rim, to hold the same bindingly, each of said members being curved transversely of its length.

In testimony whereof I have signed my name to this specification in the presence of two subscribing witnesses.

JOSEPH E. WENMAN.

Witnesses:
JAMES PALMER,
JOHN P. LEECH.